Patented June 14, 1938

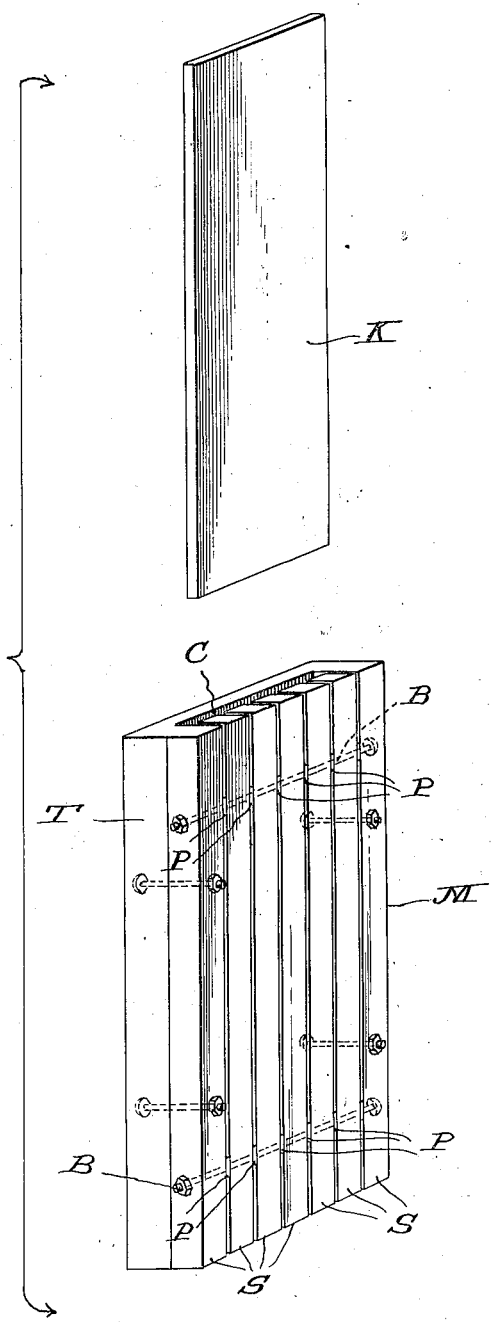

2,120,268

UNITED STATES PATENT OFFICE 2,120,268

PROCESS OF FORMING A FIBROUS CEMENT COMPOSITION

Charles H. Schuh, Ridgewood, N. Y., assignor, by mesne assignments, to Bakelite Building Products Co., Inc., New York, N. Y., a corporation of Delaware Application January 26, 1935, Serial No. 3,577

6 Claims. (Cl. 25—155)

The present invention relates to a novel method for the production of cement-fibrous products and to the products resulting therefrom.

Heretofore, various cement-fibrous compositions have been made by various processes, the most representative of which is the manufacture of the cement asbestos board which is made under exceedingly high hydraulic pressure. Generally speaking, these cement asbestos compositions have been made by first mixing together cement and ground asbestos fibre in aqueous suspension, second, feeding an Oliver type of filter to form a sheet on the filter cloth, third, removing the sheet from the filter, fourth, laying it out flat, fifth, stacking one upon another a number of sheets with sheets of metal between in a hydraulic press, and finally subjecting the stack to an exceedingly high pressure. After removal from the press the sheets are stored to harden. Although various attempts have been made to remedy the aforesaid process, none, as far as I am aware, has been wholly satisfactory, economical and practical.

It is an object of the invention to produce a cement-fibrous product having great strength, hardness, density and uniformity.

A further object of the invention is to produce a cement-fibrous product having superior qualities by the use of a simplified process and inexpensive equipment.

The present invention contemplates the provision of a practical and economical procedure for accurately molding a panel of cement-fibrous composition having a relatively high density, fine grain, smooth finished surface capable of being polished, possessing waterproof and fireproof qualities and being capable of being machined.

It is also within the contemplation of the invention to provide a process of manufacturing cement-fibrous products having an attractive color effect and surface finish.

Other objects and advantages of the invention will become apparent from the following description of a preferred procedure of carrying the invention into practice taken in conjunction with the accompanying drawing which illustrates a perspective view, somewhat digrammatic, of an apparatus for carrying out the present procedure.

I have discovered that when fibrous material is brought into a relatively fine state of subdivision and dispersion or may even be brought into a gelatinous state and is then thoroughly mixed and ground together with cement, it is possible under proper conditions to both filter and compress the mixture into a dense hard sheet in one operation and to eliminate the use of both Oliver filter and hydraulic press equipment. I have found the surprising phenomenon that the aforesaid cement-fibre mass can be filtered on a bed composed of strips of steel separated from each other by a small gap, say a distance of approximately $\frac{1}{40}$ of an inch. Moreover, I have found that even under pressure there is practically no tendency to clog the filter bed. Under these circumstances, it is possible to construct a filter bed of strips of steel of sufficient strength to withstand practically any desirable amount of pressure. I have further discovered that a filter bed may be made part of a chamber into which the mixture is pressed and by properly proportioning the chamber, a wedge type of action takes place in the chamber which permits pressure to be built up by a series of impacts instead of the application of continuous hydraulic pressure. In other words, by making the chamber sufficiently long and narrow and by applying pressure by forcing a plunger into one end of the chamber, then the wedge action takes place and it is merely necessary to apply a sufficient number of impacts to the plunger to get the desired compressive action. The wedge action holds the material in place between impacts and the effects are accumulative. In this manner, it is possible to secure compression effects far greater than has heretofore been possible with prior procedures using hydraulic pressure and with much more ease and simplicity of equipment.

For the purpose of giving those skilled in the art a better understanding of the invention, the following illustrative example will be given.

Example 1

I mix together about 24% by weight gelatinized wood pulp with about 76% by weight Portland cement. The wood pulp need not be chemically pure, that is, it may contain resinous material present in the original wood, but should have a neutral reaction. It should be finely ground and worked into a gelatinous state. Chemical treatment with acid or zinc chloride may be employed to convert part of the fibre into amyloid. Approximately 40% by weight water may be used. The mixture is run into a mold M preferably having a chamber C of the following dimensions: 8″ x 32″ x ½″. The filter bed is preferably composed of ½″ x 4″ x 32″ steel strips S separated by small pieces of metal strips P of approximately $\frac{1}{40}$″ in thickness, and is bolted together by means of a plurality of bolts B to form a slotted unit plate 8" x 32" (by 4" thick). The bolted strips constitute one of the face walls of the mold. The other face of the mold is a smooth piece of strong steel plate P of the same dimensions, namely, 8" x 32" x 1". It is preferred to strengthen the plate with angle irons. The bottom and side edges are smooth strips of steel ½" thick which are bolted tightly together. In the top edge of the mold a tightly fitting plunger K, 8" x ½" x 32" is inserted.

In other words, a hollow chamber is provided having an area of filtration and a depth at least several times the narrowest dimension of the cross-section thereof and closed at one end and open at the opposite end for the reception of a plunger. When the mold has been filled, the plunger is inserted and a series of impacts are applied to the top end thereof. The bulk of the excess water is quickly forced out through the filter bed and the wedge action becomes effective. A substantially clear filtrate is obtained. The compression action is in the same direction as the opening slots in the filter and this permits the material to slip under the action of the impact and cause the material to be compressed. The plunger may thus readily be forced half way down into the mold or even further. When the mold is opened, a panel 8" x 16" x ½" is obtained which has a smooth face on one side and which has slight parallel longitudinal ridges on the other face due to the slots in the filter bed. The sheet which is now capable of being handled is allowed to harden.

When the panel is hard it will be strong and tough and may be cut with a saw, machined, nailed, and fabricated and handled in other customary ways. The smooth face can readily be polished to a beautiful finish. Such a panel may be used for one face of a building block unit. For this latter purpose it may be desired to have the edges tongued and grooved and to accomplish this it is only necessary to make suitable provisions in the mold edge.

I have found that when such a panel is placed in an alcoholic solution of an aniline dye for sufficient time to allow the solution to penetrate and then allowed to dry thoroughly, it may then be polished and a beautiful decorative finish is obtained on the surface.

It is to be noted that in the aforesaid description, considerable detail has been given regarding mechanical details of the mold, etc. for the purpose of illustrating the wedge type of compressive action obtained. The same action may obviously be obtained in other types of molds and mechanical devices. The present invention is not to be limited to a particular type of mechanical device, but is to embrace a new general method for the production of cement-fibrous compositions embodying certain new principles, namely, first, the distribution of solid material including cement materials and fibrous materials in a liquid phase to obtain a mixture that is capable of being filtered under pressure without any difficulty of clogging the openings of an appropriate filter, and secondly, to submit such a mixture to a wedge type of compressive action under which the material may be compressed to practically any desired degree by simply subjecting it to a sufficient number of impacts.

Obviously, the fibrous material might include wood, asbestos, straw, cotton, wool, hair, metal wool, paper, silk, jute, etc. The cementitious material might include Portland cement, natural cement, Roman cement, gypsum cement, litharge, resins, casein, starch, dried blood, glue, gelatin, pyroxylin, etc. The liquid need not necessarily be an aqueous one. Where resinous materials are used appropriate solvents are employed, such as alcohols, esters, turpentine, etc.

For decorative effects, the fibrous material may be dyed before the mixture is made. Additional coloring material may be added as desired.

It is to be observed that the present invention provides a cement-fibrous product comprising a set and hardened honeycombed structure of cement containing finely dispersed fibrous material, especially of a cellulosic and gelatinous type, which has practically no visible voids, is practically impervious to water, shows substantially no visible fibres, and has a density substantially greater than twice the density of the raw materials and a tensile strength substantially greater than about 1,000 pounds per square inch.

I claim:

1. The process of forming a cement-fibrous composition in a hollow chamber having an area of filtration and a depth at least several times the narrowest dimension of a cross-section thereof and closed at one end and open at the opposite end for the reception of a plunger which comprises establishing an aqueous mixture of cement and fibrous material in the chamber, subjecting said mixture to a series of impacts, said impacts producing a wedge type of compressive action to effect a reduction in the volume of the mixture whereby an effective accumulation of pressure is produced and a successive reduction in volume of the mixture is obtained without imposing a restraining influence thereon between impacts, and continuing the said impacts until a composition of desired consistency has been produced.

2. The process of producing a compressed composition in a hollow chamber having an area of filtration and a depth at least several times the narrowest dimension of a cross-section thereof and closed at one end and open at the opposite end for the reception of a plunger which comprises, feeding a liquid cementitious mixture containing solid cementitious particles and fibrous material in the chamber, subjecting said liquid mixture to a plurality of impacts, producing with said impacts a wedge type of compressive action characterized by an effective accumulation of pressure to effect a reduction in the volume of the mixture, and producing with successive impacts successive reductions in volume of the mixture without imposing a restraining influence upon the mixture between impacts.

3. The process of producing a compressed composition in a hollow chamber having an area of filtration and a depth at least several times the narrowest dimension of a cross-section thereof and closed at one end and open at the opposite end for the reception of a plunger which comprises subjecting a liquid cementitious mixture containing solid particles and fibrous material in the chamber to a plurality of imapcts, said impacts producing a wedge type of compressive action to effect a reduction in the volume of the mixture whereby an effective accumulation of pressure is produced and a successive reduction in volume of the mixture is obtained without imposing a restraining influence thereon between impacts.

4. The process of producing a compressed cement-fibrous composition in a hollow chamber having an area of filtration and a depth at least several times the narrowest dimension of a cross-section thereof and closed at one end and open at the opposite end for the reception of a plunger which comprises subjecting an aqueous cementitious mixture containing cement and fibrous material in the chamber to a plurality of impacts, said impacts producing a wedge type of compressive action to effect a reduction in the volume of the mixture whereby an effective accumulation of pressure is produced and a successive reduction in volume of the mixture is obtained without imposing a restraining influence thereon between impacts.

5. The process of producing a compressed composition in a hollow chamber having an area of filtration and a depth at least several times the narrowest dimension of a cross-section thereof and closed at one end and open at the opposite end for the reception of a plunger which comprises subjecting a liquid cementitious mixture containing solid particles and fibrous material in the chamber to a pluralty of impacts, said impacts producing a wedge type of compressive action to effect a reduction in the volume of the mixture whereby an effective accumulation of pressure is produced and a successive reduction in volume of the mixture is obtained without imposing a restraining influence thereon between impacts.

6. The process of producing a compressed composition in a hollow chamber having an area of filtration and a depth at least several times the narrowest dimension of a cross-section thereof and closed at one end and open at the opposite end for the reception of a plunger which comprises subjecting an aqueous cementitious mixture containing a permanent binder and fibrous material in the chamber to a plurality of impacts, said impacts producing a wedge type of compressive action to effect a reduction in the volume of the mixture whereby an effective accumulation of pressure is produced and a successive reduction in volume of the mixture is obtained without imposing a restraining influence thereon between impacts.

CHARLES H. SCHUH.